US011836649B2

(12) United States Patent
Colodny et al.

(10) Patent No.: US 11,836,649 B2
(45) Date of Patent: *Dec. 5, 2023

(54) LOST ITEM RECOVERY WITH REPORTING AND NOTIFYING SYSTEM

(71) Applicant: Chargerback, Inc., Carson City, NV (US)

(72) Inventors: Brian Colodny, Reno, NV (US); Michael McLaughlin, Reno, NV (US)

(73) Assignee: Chargerback, Inc., Carson City, NV (US)

( * ) Notice: Subject to any disclaimer, the term of this patent is extended or adjusted under 35 U.S.C. 154(b) by 73 days.

This patent is subject to a terminal disclaimer.

(21) Appl. No.: 17/308,870

(22) Filed: May 5, 2021

(65) Prior Publication Data

US 2021/0256535 A1 Aug. 19, 2021

Related U.S. Application Data

(63) Continuation of application No. 15/181,187, filed on Jun. 13, 2016, now Pat. No. 11,004,086, which is a
(Continued)

(51) Int. Cl.
*G06Q 30/00* (2023.01)
*G06Q 10/08* (2023.01)
(Continued)

(52) U.S. Cl.
CPC ....... *G06Q 30/016* (2013.01); *G06F 3/04842* (2013.01); *G06F 40/134* (2020.01);
(Continued)

(58) Field of Classification Search
CPC .. G06Q 30/016; G06Q 10/083; G06Q 10/087; G06Q 50/12; G06F 40/134; G06F 40/174; G06F 3/04842; G06F 16/90335
See application file for complete search history.

(56) References Cited

U.S. PATENT DOCUMENTS 5,955,952 A 9/1999 Bergman
6,259,367 B1 * 7/2001 Klein ................. G08B 21/0227
340/568.1
(Continued)

OTHER PUBLICATIONS

Office Action for U.S. Appl. No. 13/224,247, dated Jun. 21, 2013.
(Continued)

*Primary Examiner* — Justin S Lee
*Assistant Examiner* — Carl E Barnes, Jr.

(57) ABSTRACT

In one embodiment, a system and method for reporting lost items includes presenting a lost item reporting link associated with an entity having a plurality of different physical establishment locations; receiving a user selection of the lost item reporting link; presenting at a website, in response to the user selection of the lost item reporting link, a graphical user interface configured to solicit lost item recovery information, the website being associated with the entity having the plurality of different physical establishments; receiving the lost item recovery information via the graphical user interface; and transmitting the lost item recovery information to a third party online lost and found system.

22 Claims, 6 Drawing Sheets

Related U.S. Application Data continuation of application No. 13/842,768, filed on Mar. 15, 2013, now Pat. No. 9,367,527, and a continuation-in-part of application No. 13/631,456, filed on Sep. 28, 2012, now abandoned, which is a continuation-in-part of application No. 13/224,247, filed on Sep. 1, 2011, now abandoned.

(60) Provisional application No. 61/379,687, filed on Sep. 2, 2010.

(51) Int. Cl.
| | |
|---|---|
| G06Q 50/12 | (2012.01) |
| G06F 40/134 | (2020.01) |
| G06F 40/174 | (2020.01) |
| G06F 3/0484 | (2022.01) |
| G06Q 30/016 | (2023.01) |
| G06Q 10/087 | (2023.01) |
| G06F 3/04842 | (2022.01) |
| G06Q 10/083 | (2023.01) |
| G06F 16/903 | (2019.01) |

(52) U.S. Cl.
CPC ......... *G06F 40/174* (2020.01); *G06Q 10/083* (2013.01); *G06Q 10/087* (2013.01); *G06Q 50/12* (2013.01); *G06F 16/90335* (2019.01)

(56) References Cited

U.S. PATENT DOCUMENTS

| | | | |
|---|---|---|---|
| 6,449,611 | B1 | 9/2002 | Frankel |
| 6,466,983 | B1 | 10/2002 | Strazza |
| 6,604,087 | B1 | 8/2003 | Kolls |
| 6,609,106 | B1 | 8/2003 | Robertson |
| 6,974,077 | B1 | 12/2005 | Beyder |
| 7,242,279 | B2 | 7/2007 | Wolfe |
| 7,290,288 | B2 | 10/2007 | Gregg |
| 7,318,069 | B2 | 1/2008 | Takahashi et al. |
| 7,379,978 | B2 | 5/2008 | Anderson |
| 7,424,473 | B2 | 9/2008 | Orton, III et al. |
| 7,427,024 | B1 | 9/2008 | Gardzinski |
| 7,653,553 | B2 | 1/2010 | Das et al. |
| 7,885,999 | B2 | 2/2011 | St Marie |
| 7,912,842 | B1 | 3/2011 | Bayliss |
| 8,160,972 | B1 | 4/2012 | Tannenbaum |
| 8,370,062 | B1 | 2/2013 | Starenky |
| 8,370,168 | B1 | 2/2013 | Jenkins et al. |
| 8,577,689 | B1 | 11/2013 | Czarnetzky |
| 8,973,813 | B2 | 3/2015 | Penny et al. |
| 9,367,527 | B2 | 6/2016 | Colodny et al. |
| 9,408,072 | B2 | 8/2016 | Bombolowsky |
| 9,626,645 | B2 | 4/2017 | Colodny |
| 9,665,913 | B2 | 5/2017 | Loutit |
| 10,521,802 | B2 | 12/2019 | Colondy et al. |
| 11,004,086 | B2 | 5/2021 | McLaughlin |
| 11,216,824 | B1 | 1/2022 | Faga |
| 2002/0032573 | A1* | 3/2002 | Williams ............. G06Q 10/083 705/335 |
| 2002/0052751 | A1 | 5/2002 | Ebata |
| 2002/0072924 | A1 | 6/2002 | Gray |
| 2002/0178041 | A1 | 11/2002 | Krantz et al. |
| 2003/0036950 | A1 | 2/2003 | Nguyen |
| 2003/0065595 | A1 | 4/2003 | Anglum |
| 2004/0002998 | A1* | 1/2004 | Takahashi ......... G06F 16/24573 |
| 2004/0019609 | A1 | 1/2004 | Orton et al. |
| 2004/0035644 | A1 | 2/2004 | Ford |
| 2004/0049396 | A1 | 3/2004 | Hope |
| 2004/0124239 | A1* | 7/2004 | Feld ....................... G06Q 10/08 235/375 |
| 2004/0153413 | A1* | 8/2004 | Gross ..................... G06Q 30/06 705/52 |
| 2004/0172335 | A1 | 9/2004 | Batoff |
| 2005/0033615 | A1 | 2/2005 | Nguyen et al. |
| 2005/0171932 | A1 | 8/2005 | Nandhra |
| 2006/0201447 | A1 | 9/2006 | Meadows |
| 2007/0011017 | A1 | 1/2007 | Field |
| 2007/0088569 | A1 | 4/2007 | Berkelhamer et al. |
| 2007/0109126 | A1 | 5/2007 | House |
| 2007/0138272 | A1 | 6/2007 | Saperstein |
| 2007/0138273 | A1 | 6/2007 | Saperstein |
| 2007/0138274 | A1 | 6/2007 | Saperstein |
| 2007/0156677 | A1 | 7/2007 | Szabo |
| 2007/0226086 | A1 | 9/2007 | Bauman |
| 2008/0035722 | A1 | 2/2008 | Feld |
| 2008/0059256 | A1 | 3/2008 | Lynch |
| 2008/0079581 | A1 | 4/2008 | Price |
| 2008/0129488 | A1 | 6/2008 | Hill |
| 2008/0301281 | A1 | 12/2008 | Wang |
| 2009/0013060 | A1 | 1/2009 | St Marie |
| 2009/0187433 | A1 | 7/2009 | Nudd |
| 2009/0230191 | A1 | 9/2009 | Saperstein |
| 2009/0287498 | A2 | 11/2009 | Choi |
| 2009/0319561 | A1 | 12/2009 | Hosp et al. |
| 2010/0035220 | A1 | 2/2010 | Herz et al. |
| 2010/0042461 | A1 | 2/2010 | Carpenter |
| 2010/0223245 | A1* | 9/2010 | Vermilye ............... G06Q 10/08 707/706 |
| 2010/0332356 | A1 | 12/2010 | Spolar |
| 2011/0061018 | A1 | 3/2011 | Piratla et al. |
| 2011/0167125 | A1 | 7/2011 | Achlioptas |
| 2011/0234399 | A1 | 9/2011 | Yan |
| 2012/0059661 | A1 | 3/2012 | Colodny |
| 2012/0059693 | A1 | 3/2012 | Colodny et al. |
| 2012/0066008 | A1 | 3/2012 | Scudder |
| 2012/0084165 | A1 | 4/2012 | Shigeki |
| 2012/0267430 | A1 | 10/2012 | Penny |
| 2013/0212042 | A1 | 8/2013 | Rosenberg |
| 2013/0284804 | A1 | 10/2013 | Saywa |
| 2014/0052660 | A1 | 2/2014 | Lee |
| 2014/0095274 | A1 | 4/2014 | McLaughlin |
| 2014/0280510 | A1 | 9/2014 | Putnam |
| 2014/0281857 | A1 | 9/2014 | Colodny |
| 2014/0327518 | A1 | 11/2014 | Loutt |
| 2015/0046206 | A1 | 2/2015 | Kelley |
| 2015/0205835 | A1 | 7/2015 | McLaughlin |
| 2016/0210675 | A1 | 7/2016 | Smart |
| 2016/0224934 | A1 | 8/2016 | Ramalingam |
| 2016/0275442 | A1 | 9/2016 | Colodny |
| 2016/0300238 | A1 | 10/2016 | Colodny |
| 2017/0140183 | A1 | 5/2017 | Rinehart |
| 2017/0201517 | A1 | 7/2017 | Gardzinkski |
| 2017/0206244 | A1 | 7/2017 | Colondy et al. |
| 2017/0220966 | A1 | 8/2017 | Wang |
| 2017/0221162 | A1 | 8/2017 | Colondy et al. |
| 2017/0293950 | A1 | 10/2017 | Rathod |
| 2018/0121871 | A1 | 5/2018 | Abdollahzadeh |
| 2018/0174093 | A1 | 6/2018 | Perez |
| 2018/0349846 | A1 | 12/2018 | Sever |
| 2018/0349861 | A1 | 12/2018 | Goja |
| 2019/0095965 | A1 | 3/2019 | Stayner |
| 2019/0355077 | A1 | 11/2019 | Ahmed |

OTHER PUBLICATIONS

Office Action for U.S. Appl. No. 13/224,244, dated Jun. 27, 2013.
U.S. Appl. No. 13/631,456, filed Sep. 28, 2012.
U.S. Appl. No. 13/842,768, filed Mar. 15, 2013.
Final Office Action for U.S. Appl. No. 13/224,247, dated Oct. 7, 2013.
Amazon "Checkout by Amazon", https://payments.amazon.com/sdui/sdui/business/cba#features, Apr. 1, 2010.
Stamps "USPS Shipping at Your Fingertips", http://www.stamps.com/welcom/, Aug. 26, 2010.
Final Office Action for U.S. Appl. No. 13/224,244, dated Jan. 8, 2014.
Final Office Action for U.S. Appl. No. 13/224,247, dated Jun. 17, 2014.
Office Action for U.S. Appl. No. 13/631,456, dated Jun. 17, 2014.
Office Action for U.S. Appl. No. 13/631,456, dated Oct. 6, 2014.
Office Action for U.S. Appl. No. 13/224,247, dated Oct. 7, 2014.

(56) References Cited

OTHER PUBLICATIONS

Office Action for U.S. Appl. No. 13/631,456, dated Feb. 11, 2015.
Office Action for U.S. Appl. No. 13/842,768, dated Jul. 29, 2015.
Final OA for U.S. Appl. No. 13/224,247 mailed Sep. 1, 2011.
Office Action for U.S. Appl. No. 13/631,456 dated Dec. 7, 2015.
Final Office Action for U.S. Appl. No. 13/842,768, dated Dec. 9, 2015.
Notice of Allowance for U.S. Appl. No. 13/842,768, dated Mar. 16, 2016.
Office Action for U.S. Appl. No. 14/158,658 dated Apr. 6, 2016.
Office Action for U.S. Appl. No. 13/224,247 dated Apr. 21, 2016.
Office Action for U.S. Appl. No. 13/631,456 dated May 6, 2016.
FulcrumTech, How to Create an Effective Call-to-Action; 10 Tips to Help Drive Conversions to your Email Campaign, www.fulcrumtech.net/resources/how-to-create-an-effective-call-to-action/, Jun. 2010.
Final Office Action for U.S. Appl. No. 14/497,095, dated Sep. 25, 2016.
Merriam Webster Dictionary "Coupon", http://merriam-webster.com/dictionary/coupon, Sep. 4, 2006.
Final Office Action for U.S. Appl. No. 13/224,247, dated Sep. 23, 2016.
Notice of Allowance for U.S. Appl. No. 14/158,658, dated Oct. 20, 2016.
Office Action for U.S. Appl. No. 13/224,244, dated Dec. 14, 2016.
Office Action for U.S. Appl. No. 13/224,247, dated May 9, 2017.
Final Office Action for U.S. Appl. No. 13/224,244, dated May 24, 2017.
Office Action for U.S. Appl. No. 15/181,187, dated Jun. 16, 2017.
Office Action for U.S. Appl. No. 15/170,098, dated Jun. 30, 2017.
Office Action for U.S. Appl. No. 13/631,456, dated Aug. 11, 2017.
Office Action for U.S. Appl. No. 14/497,095, dated Aug. 25, 2017.
Office Action for U.S. Appl. No. 13/224,244, dated Aug. 31, 2017.
Final Office Action for U.S. Appl. No. 13/224,247, dated Sep. 28, 2017.
Final Office Action for U.S. Appl. No. 13/224,244, dated Jan. 16, 2018.
Final Office Action for U.S. Appl. No. 15/170,098, dated Feb. 7, 2018.
Final Office Action for U.S. Appl. No. 15/181,187, dated Mar. 5, 2018.
Final Office Action for U.S. Appl. No. 13/631,456 dated Mar. 8, 2018.
Office Action for U.S. Appl. No. 15/181,187, dated Nov. 21, 2018.
Final Office Action for U.S. Appl. No. 15/170,098, dated Dec. 31, 2018.
MS Shift, "Command and Control Your Hotel: Lost & Found—Admin User's Guide," www.msshift.com, © 2009.
MS Shift, "Command and Control Your Hotel: Lost & Found—User's Guide," www.msshift.com, © 2008.
"Command and Control your Hotel with MS Shift Hotel Security Systems" brochure, www.msshift.com, © 2008.
Notice of Intent to Issue Ex Parte Reexamination Certificate, U.S. Appl. No. 90/014,004, mailed Aug. 14, 2018.
Office Action in Ex Parte Reexamination Certificate, U.S. Appl. No. 90/014,004, mailed May 1, 2018.
Decision on Petition under 37 CFR 1.515 and 1.81, U.S. Appl. No. 90/014,004, dated Jan. 17, 2018.
Order Denying Request for Ex Parte Examination, U.S. Appl. No. 90/014,004, mailed Aug. 14, 2018.
Request for Ex Parte Examination, U.S. Appl. No. 90/014,004, mailed Aug. 25, 2017.
Order Denying Request for Ex Parte Examination, U.S. Appl. No. 90/014,004, mailed Oct. 18, 2017.
Final Office Action for U.S. Appl. No. 15/181,187, dated Apr. 3, 2019.
Office Action for U.S. Appl. No. 15/382,267, dated Apr. 4, 2019.
Office Action for U.S. Appl. No. 16/254,530, dated Sep. 18, 2019.
Notice of Allowance for U.S. Appl. No. 15/170,098, dated Sep. 25, 2019.
S.E. Robertson Simple, proven approaches to text retrival, 1994, University Cambridge Computer Laboratory.
Weiwei Cui, TextFlow, Towards better understanding of evolving topics in text, 2011, IEEE Transactions on Visualization and Computer graphics.
Notice of Allowance for U.S. Appl. No. 15/488,377, dated Oct. 9, 2019.
Office Action for U.S. Appl. No. 15/476,971, dated Dec. 12, 2019.
Final Office Action for U.S. Appl. No. 16/254,530, dated Jan. 8, 2020.
Office Action for U.S. Appl. No. 16/687,621, dated Mar. 6, 2020.
Office Action for U.S. Appl. No. 16/254,530, dated May 1, 2020.
Notice of Allowance for U.S. Appl. No. 16/687,621, dated May 14, 2020.
Office Action for U.S. Appl. No. 16/690,068, dated Jul. 23, 2020.
Final Office Action for U.S. Appl. No. 15/476,971, dated Jul. 24, 2020.
16254530 NPL—EIC 3600 Search Report (Year: 2020).
Final Office Action for U.S. Appl. No. 16/254,530, dated Oct. 5, 2020.
Office Action for U.S. Appl. No. 16/690,068, dated Dec. 10, 2020.
Office Action for U.S. Appl. No. 16/687,624, dated Jan. 7, 2021.
Office Action for U.S. Appl. No. 16/404,714, dated Feb. 25, 2021.
Dufl, How it Works, Mar. 21, 2015 https://www.dufl.com/how-it-works/ (accessed on Feb. 16, 2021) (Year: 2015).
GeekWire, Business Travelers Rejoice, DUFL Will Pack, Ship & Clean Your Clothes For You, May 1, 2015 (accessed on Feb. 16, 2021) (Year: 2015).
DUFL, Premium Travel Service DUFL Sets Out To Change the Way The World Travels, https://www.dufl.com/press/premium-travel-service-dufl-sets-change-way-world-travels/ (accessed on Feb. 16, 2021) (Year: 2015).
Final Office Action for U.S. Appl. No. 16/687,624, dated Apr. 15, 2021.
Notice of Allowance for U.S. Appl. No. 16/690,068, dated Jul. 15, 2021.
Office Action for U.S. Appl. No. 16/752,649, dated Aug. 5, 2021.
Final Office Action for U.S. Appl. No. 16/404,714, dated Aug. 11, 2021.
Non-Final Office Action for U.S. Appl. No. 16/752,649, dated Oct. 13, 2022.
Non-Final Office for U.S. Appl. No. 17/308,870, dated Oct. 17, 2022.
Final Office Action for U.S. Appl. No. 16/404,714, dated Jan. 26, 2023.

\* cited by examiner

502 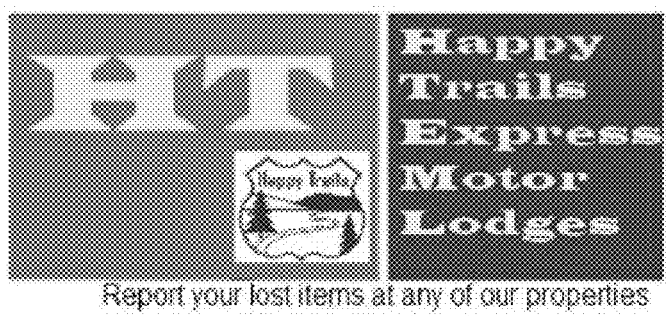 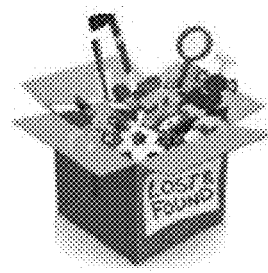

Report your lost items at any of our properties

Which Of Our Properties Did You Visit?

504 Choose: [ HAPPY TRAILS, LAS VEGAS, NEVADA ▼ ] 512

506 Please Describe What You Lost

Item: [            ]

Date of Loss: [       ]

Where Was Your Item Last Seen?
(i.e. room #, lobby, restaurant...)

[                    ]

508 Your Contact Info

First Name: [       ]

Last Name: [       ]

Phone Number: [    ]

Email Address: [         ]

510 Return Shipping Address

Street: [       ]

City: [       ]

State: [       ]

Zip Code: [       ]

[ REPORT LOST ITEM ]

FIG. 5

LOST ITEM RECOVERY WITH REPORTING AND NOTIFYING SYSTEM

CROSS-REFERENCE TO RELATED APPLICATIONS

This application is a continuation of U.S. application Ser. No. 15/181,187, filed Jun. 13, 2016 and entitled "LOST ITEM RECOVERY WITH REPORTING AND NOTIFYING SYSTEM," which is hereby incorporated herein by reference in its entirety, and which in turn is a continuation of U.S. application Ser. No. 13/842,768, filed Mar. 15, 2013 and entitled "CENTRALIZED LOST AND FOUND SYSTEM," which is hereby incorporated herein by reference in its entirety.

Additionally, prior U.S. application Ser. No. 15/181,187 is a continuation-in-part of U.S. application Ser. No. 13/631,456, filed Sep. 28, 2012, and entitled "LOST ITEM DATABASE TO FACILITATE RECOVERY OF LOST ITEMS," which is hereby incorporated herein by reference in its entirety, which is a continuation-in-part of U.S. application Ser. No. 13/224,247, filed Sep. 1, 2011, entitled "MAINTAINING AND USING A LOST ITEM DATABASE," which is hereby incorporated herein by reference in its entirety, and which claims priority to U.S. Provisional Patent Application No. 61/379,687, filed Sep. 2, 2010, entitled "SYSTEM AND METHOD FOR INVENTORY AND RETURN OF LOST ITEMS," which is hereby incorporated herein by reference in its entirety.

BACKGROUND OF THE INVENTION

Everyone has forgotten a personal item at least once. Once lost, the items may or may not ever be returned to the rightful owner. For example, when on vacation, a user may forget an item(s) in a hotel room. In another example, a customer may forget an item in a rental car, sporting event, or any other establishment or event. The most common item left in hotel rooms is chargers, such as a cell phone charger. However, any other valuable items may also be lost or left behind such as clothing, cell phones, jewelry, and the like. Typically, hotel personnel simply toss the lost charger in a lost-and-found box at the front desk, wait for a phone call from the customer, then rummage through the lost-and-found box to see if the description provided by the customer matches any charger they have in the lost-and-found box.

For large entities having many establishment or locations throughout the world or brokers acting as intermediaries for those establishments, reporting and returning lost and found items is even more difficult. Currently, the typical method of reporting lost and found items at large entities involves receiving a report via telephone form a customer. The report is then transcribed and forwarded to one of their many establishments or converted to email and forwarded individually. The current process is labor intensive, inefficient and prone to many errors, including being lost or never used to reunite the lost item with its owner.

SUMMARY

Embodiments of the invention provide a centralized lost and found system for large entities that have a plurality of establishment or locations. The centralized lost and found system will allow users to recover their lost items in a cost effective and efficient manner from at least one establishment or location of the large entity.

In one embodiment, a method for reporting lost items includes presenting a lost item reporting link associated with an entity having a plurality of different physical establishment locations, receiving a user selection of the lost item reporting link, presenting at a website, in response to the user selection of the lost item reporting link, a graphical user interface configured to solicit lost item recovery information, the website being associated with the entity having the plurality of different physical establishments, receiving the lost item recovery information via the graphical user interface, the lost item recovery information concerning a lost item and including at least (i) a designation one of the plurality of different physical establishment locations, (ii) description of lost item, (iii) contact information, (iv) shipping information for the lost item, transmitting the lost item recovery information to a third party online lost and found system, preparing a lost and found report based on the lost item recovery information, and initiating electronic transmission of the lost and found report to the designation of one of the plurality of different physical establishment locations.

In one embodiment, a computer readable medium including at least computer program code stored thereon for reporting lost items comprises computer program code for presenting a graphical user interface configured to solicit lost item recovery information, the graphical user interface being presented via a website associated with an entity having a plurality of different physical establishment locations, computer program code for receiving the lost item recovery information submitted via the graphical user interface, the lost item recovery information concerning a lost item and including at least (i) a designation one of the plurality of different physical establishment locations, and (ii) description of lost item, computer program code for transmitting the lost item recovery information to a third party online lost and found system, computer program code for preparing a lost and found report based on the lost item recovery information, and computer program code for initiating electronic transmission of the lost and found report to the designation of one of the plurality of different physical establishment locations.

In another embodiment, a method for reporting lost items, includes (i) distributing a transaction identifier to a recent customer, (ii) providing an online lost item reporting location, receiving the transaction identifier at the online lost item reporting location, (iii) retrieving, from a data storage device, customer transaction data associated with the received transaction identifier, (iv) directing a graphical user interface to be presented to solicit lost item recovery information, the graphical user interface being presented via a website associated with an entity having a plurality of different physical establishment locations, (v) receiving the lost item recovery information submitted via the graphical user interface, the lost item recovery information concerning a lost item and including at least a description of lost item, and (iv) transmitting the lost item recovery information and at least a portion of the customer transaction data to a third party online lost and found system.

In one embodiment, an online lost and found system includes a memory configured to store computer program code, a database configured to store lost item information for a plurality of different establishments, and at least one computing device including at least one processor for executing at least a portion of the computer program code, wherein the computer program code includes at least: (i) computer program code for receiving a lost item report including a transaction identifier associated with a transaction associated with a person that has lost an item, the lost item report including at least a description of the lost item; (ii) computer program code for retrieving customer transaction data associated with the transaction identifier; (iii) computer program code for recording data for the lost item in the database; (iv) computer program code for determining a particular establishment from the plurality of establishments based on the transaction identifier; (v) computer program code for initiating notification of the particular establishment of the lost item; and (vi) computer program code for facilitating recovery of the lost item to the person that lost the item.

Other aspects and advantages of the invention will become apparent from the following detailed description taken in conjunction with the accompanying drawings which illustrate, by way of example, the principles of the invention.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings:

FIG. 5 illustrates an example graphical user interface to report lost item information.

DESCRIPTION OF EXAMPLE EMBODIMENTS

Embodiments are described herein in the context of a centralized lost and found system. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Embodiments of the invention allow users to recover their lost items in a cost effective and efficient manner from large entities having a plurality of establishments or locations. Since the process is automated, efficient, and more cost effective, the likely hood that the user is reunited with his lost item is high. Furthermore, the cost of shipping is lower than the cost to replace the lost item. As such, a consumer (and establishment) may be more inclined to have their lost items returned rather than buying a new one.

Several embodiments of the invention are discussed below with reference to FIGS. 1-6. However, those skilled in the art will readily appreciate that the detailed description given herein with respect to these figures is for explanatory purposes as the invention can extend beyond these limited embodiments.

Figure 1:
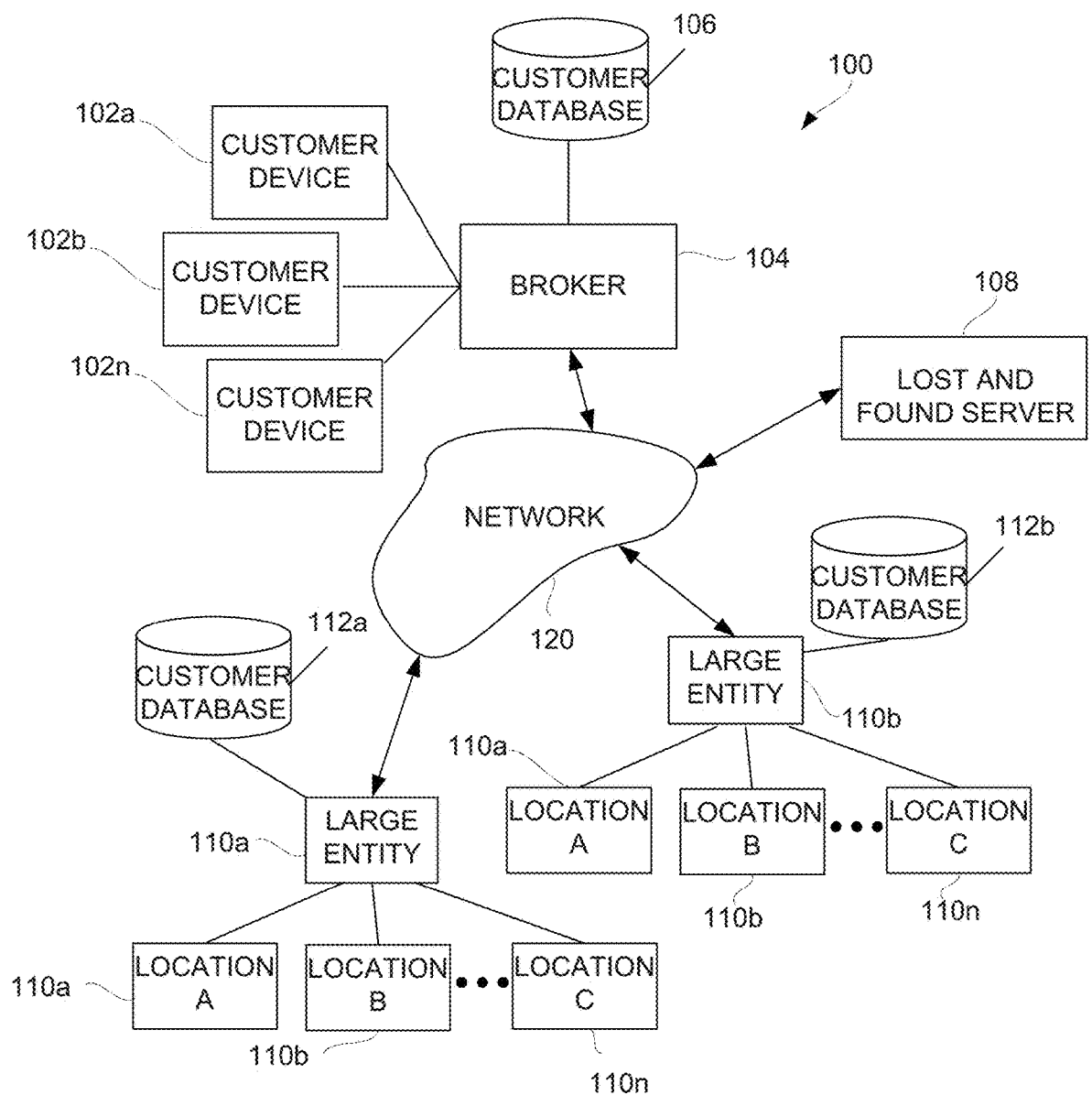
FIG. 1 illustrates an example centralized lost and found system.

FIG. 1 illustrates an example centralized lost and found system. The system 100 can have a plurality of large entities 110a, 110b. The large entities 110a, 110b may have a plurality of physical locations 114a-n (where n is an integer). The large entities 110a, 110b may be, for example, a large hotel chain having a plurality of physical hotels. In another example, the large entity 110a, 110b may be a rental car company having a plurality of physical rental locations. In still another example, the large entity 110a-110b may be a construction company having a plurality of malls.

Each of the large entities 110a, 110b may have a customer database 112a, 112b. The customer database may be configured to store customer information such as name, contact information, electronic mail address, reservation dates, reservation fees, payment fees, check-out dates, and any other desired information. Although not illustrated, each location 114a-n may also have a customer database configured to store customer information.

The system 100 may also have a broker 104. The broker 104 may be any third party entity acting as intermediaries for the large entities 110a, 110b. For example, the broker may be similar to Travelocity®, Priceline®, or Hotels.com® whereby the broker may provide a centralized location for a plurality of customer devices 102a-n to compare and select goods or services from a list of large entities. Broker 104 may also have a customer database 106 configured to store customer information such as name, contact information, electronic mail address, reservation dates, reservation fees, payment fees, check-out dates, and any other desired information.

When a customer device 102a-n purchases a good or server from broker 104, broker 104 may store the customer information in customer database 106. Broker 104 may also transmit the customer information to the associated large entity 110a, 110b for storage in its associated customer database 112a, 112b. Customer device 102a-n can be a computing device such as, but not limited to, a desktop computer, a laptop computer, a tablet computer, or a netbook computer. In another embodiment, customer device 102a-n may be a portable electronic device such as a cell phone, a smart phone, a portable media player, a portable gaming device, a personal digital assistant or the like.

Example

Examples are provided for illustrative purposes only and are not meant to be limiting. For example, although illustrated with the large entity as a hotel chain, any other type of large entity may benefit from the present invention such as car rental companies, airlines, event coordinators, cruise ship, casino, and the like.

A customer device 102*a-n* may use Broker 104 to make a reservation to stay at Great Hotel, in Sacramento, Calif. for one (1) day and another Great Hotel location in San Diego, Calif. for the following day. Broker 104 may store the customer information in its customer database 106, assign a transaction identifier to the client reservation, and transmit a reservation notification to the corporate office for Great Hotel. The reservation notification includes at least some or all of the customer information.

After the customer's stay in Great Hotel in Sacramento and San Diego, he remembers that he left his cell phone charger in one of the hotel rooms. Unfortunately, he does not remember which Great Hotel room. The customer may then transmit a lost item report to Broker 104 via Broker's 104 website.

In one embodiment, there may be a link on the Broker's website to input lost item information. When the link is clicked, customer may be directed to a graphical user interface (GUI) as illustrated and further described with reference to FIG. 5. The GUI may have the look and feel of the Great Hotel website, however, the lost item information may, in fact, be received by lost and found server 108. Thus, the fact that the lost item information is transmitted to the lost and founder server 108 is transparent to the customer.

Broker 104 and large entities 110*a*, 110*b* may be configured to communicate with lost and found server 108 via network 120 through any known wired or wireless connections. Wireless connections may be any known wireless methods such as a 3G wireless technology, 4G wireless technology, Bluetooth, wireless universal serial bus, WiMax, IEEE 802.11x, LTE, or 802.16 technology, radio frequency, narrow-beam infrared (IR) sensor, point-to-point microwave communication, WiFi, or any other known wireless methods.

In another embodiment, when the customer made the reservation, he was assigned a transaction identifier unique to the customer. The unique transaction identifier may be displayed on the customer's receipt, an email transmitted to the customer, or transmitted in any known methods to the customer. For example, when the customer checks out of Great Hotels, he may be provided the transaction identifier. In another example, the transaction identifier may be included with a follow-up correspondence to the customer for customer feedback. The GUI used to input lost item information may direct the customer to input the transaction identifier. Broker 104 may match the transaction identifier to the customer and pre-populate some of the lost item information, such as contact information, customer name, hotel stayed at, and the like. The lost item information may then be transmitted and/or received by lost and found server 108.

In still another embodiment, customer may go directly to the Great Hotel webpage to input lost item information. The Great Hotel webpage may have a link the customer may select to input the lost item information. The customer may input his transaction identifier. Great Hotel may contact Broker 104 to obtain customer information. Broker 104 may match the transaction identifier to the customer and pre-populate some of the lost item information, such as contact information, customer name, hotel stayed at, and the like.

Once lost and found server 108 obtains the lost item information, lost and found server 108 may transmit a lost item report or notification to both the Great Hotel locations in Sacramento and San Diego (since the customer was not sure where he lost the cell phone charger) as well as Broker 104. The lost item report or notification may inform the customer that the lost item information was received and that a notification was transmitted to each of the Great Hotel locations. The lost item report or notification transmitted to Broker 104 and/or each of the Great Hotel locations may inform the hotels that a cell phone charger was lost and to contact the customer to if the lost item is/was found.

The lost item report or notification may be transmitted to the customer, Broker 104, and Great Hotel via any known transmission methods such as via electronic mail, facsimile, and the like. The electronic mail address, facsimile number, or any other contact information for the customer may be obtained from the Broker 106 and/or Great Hotel (e.g. large entity 110*a*, 110*b*). Additionally, the electronic mail address, facsimile number, or any other contact information for the Broker 104 and/or Great Hotel (e.g. large entity 110*a*, 110*b*) may be stored on the lost and found server 108.

Using lost and found server 108 to organize and coordinate lost and found items and information provides for a centralized lost and found system. The centralized system provides for a more efficient and organized reporting system of lost items. Lost and found server 108 may also be configured to maintain complete transaction logs that can serve as a chain of custody for the lost items, may automatically and electronically notify all parties to the transactions as to the current status of the lost report, collect payment for return shipping charges of a recovered lost item to the customer, and any other desired services for a lost and found item.

Figure 2:
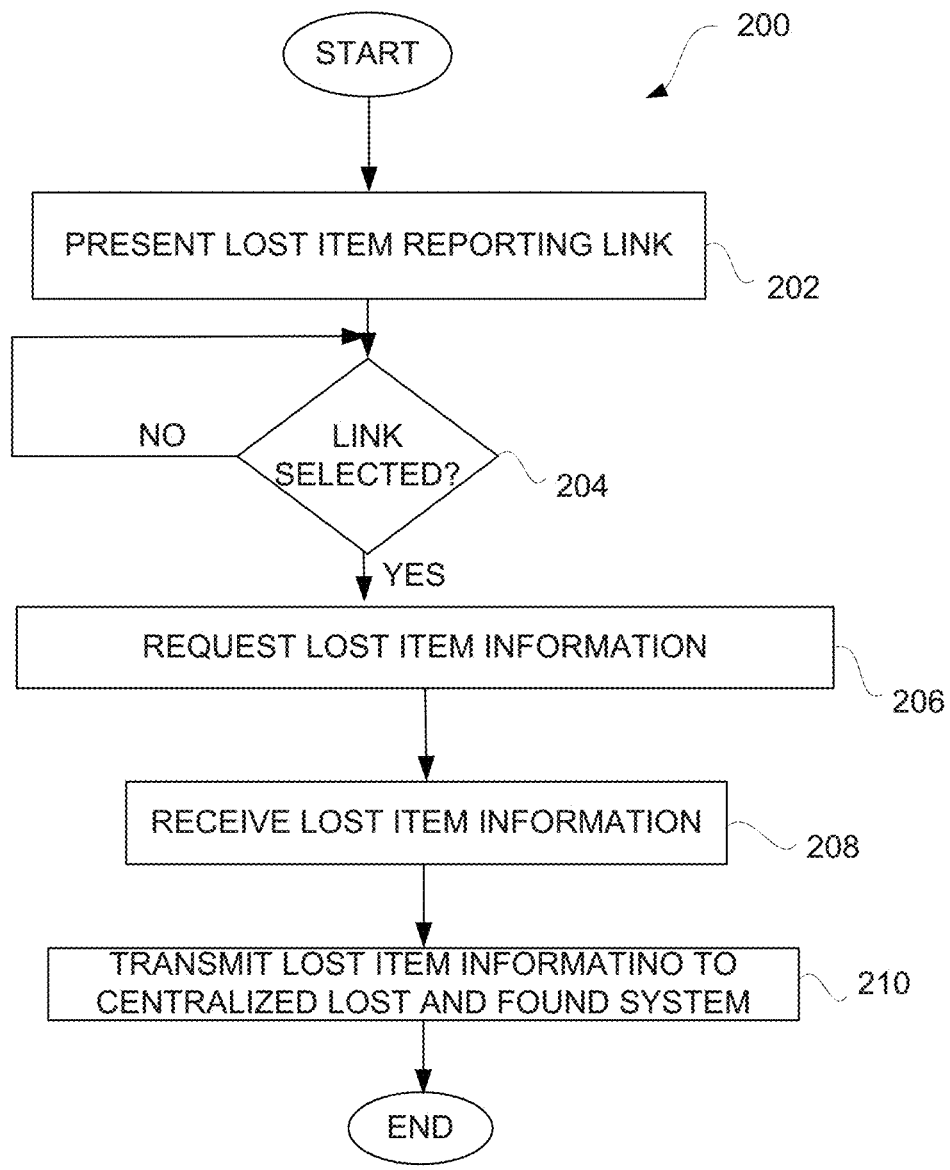
FIG. 2 illustrates an example method for reporting a lost item.

FIG. 2 illustrates an example method for reporting a lost item. The method 200 may begin with presenting a lost item reporting link at 202 on a GUI. If the link is selected at 204, a lost item information reporting GUI may be presented at 206. If the link is not selected at 204, the method 200 may wait until the link is selected.

The GUI to report lost item information may be similar to the GUI described and illustrated with reference to FIG. 5. The lost item information may be any information about the lost item such as where and when the item was lost, a description of the lost item, contact information for the customer, and the like. The lost item information may be received at 208 and transmitted to a third-party centralized lost and found system at 210.

Figure 3:
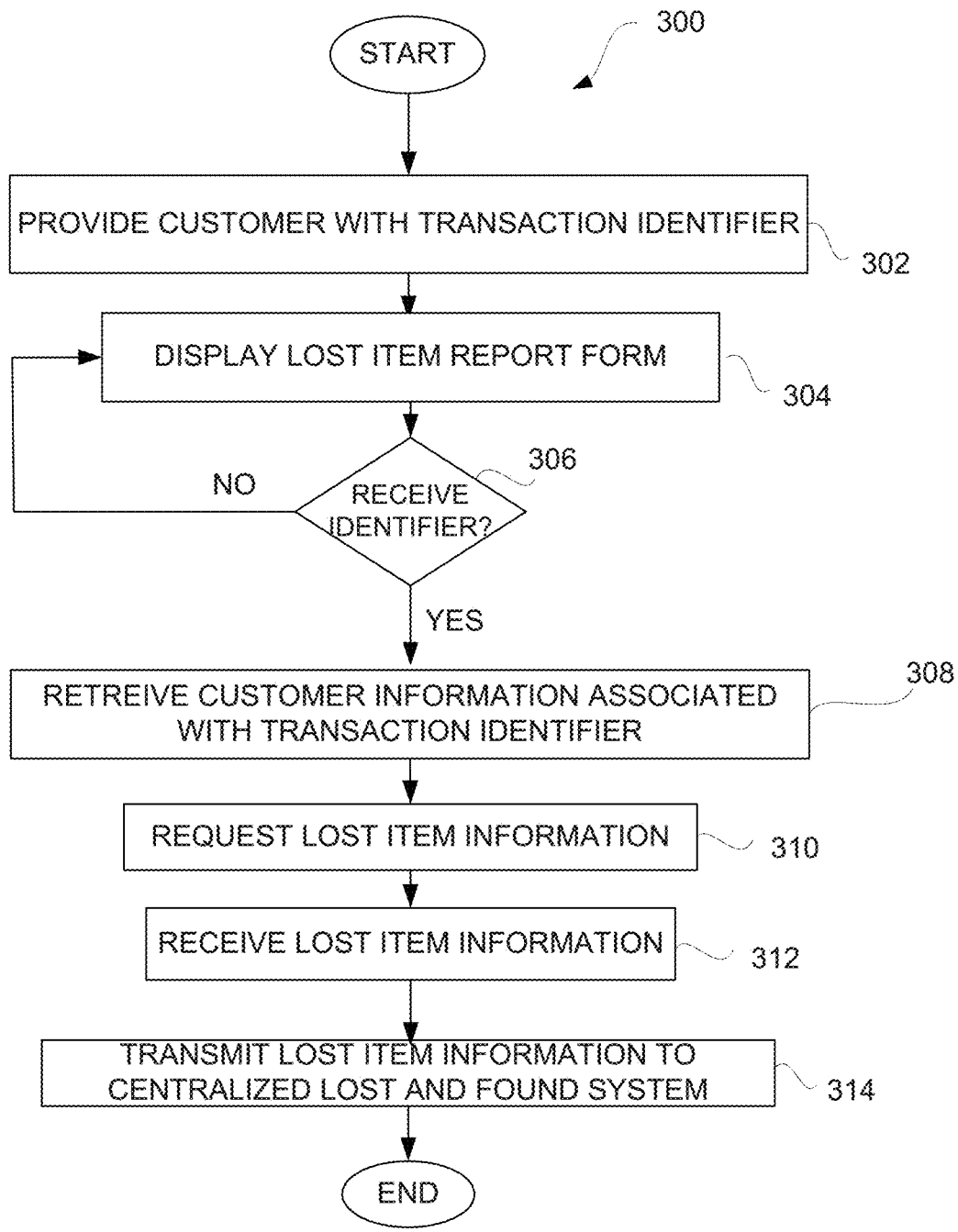
FIG. 3 illustrates another example method for reporting a lost item.

FIG. 3 illustrates another example method for reporting a lost item. The method 300 may begin with providing a customer with a transaction identifier at 302. When the customer made a reservation, purchased a service or product, or otherwise interacted with a broker (e.g., Broker 104 illustrated in FIG. 1) or large entity (e.g., large entity 110*a*, 110*b*) he may be assigned a unique transaction identifier. The unique transaction identifier may be displayed on the customer's receipt, an email transmitted to the customer, or transmitted in any known methods to the customer. For example, when the customer checks out of a hotel, returns a car, or any other similar transaction, he may be provided the transaction identifier. In another example, the transaction identifier may be included with a follow-up correspondence to the customer for customer feedback.

If the customer lost an item, a lost item report may be displayed at 304. The GUI used to input lost item information may direct the customer to input the transaction identifier. If the transaction identifier is not received at 306, the method may wait for receipt of the transaction identifier. If the transaction identifier is received at 306, customer information associated with the unique transaction identifier may be retrieved from a database at 308. The database may be associated with a broker (e.g., broker 104 illustrated in FIG. 1) or large entity (e.g., large entity 110*a*, 110*b*).

Lost item information may be requested at 310. The lost item information may be information, such as contact information, customer name, product or service used (e.g., hotel stayed at, car rented, and the like). The lost item information may then be received at 312. The lost item information and at least a portion of the customer information may be transmitted to a centralized lost and found server at 314.

Figure 4:
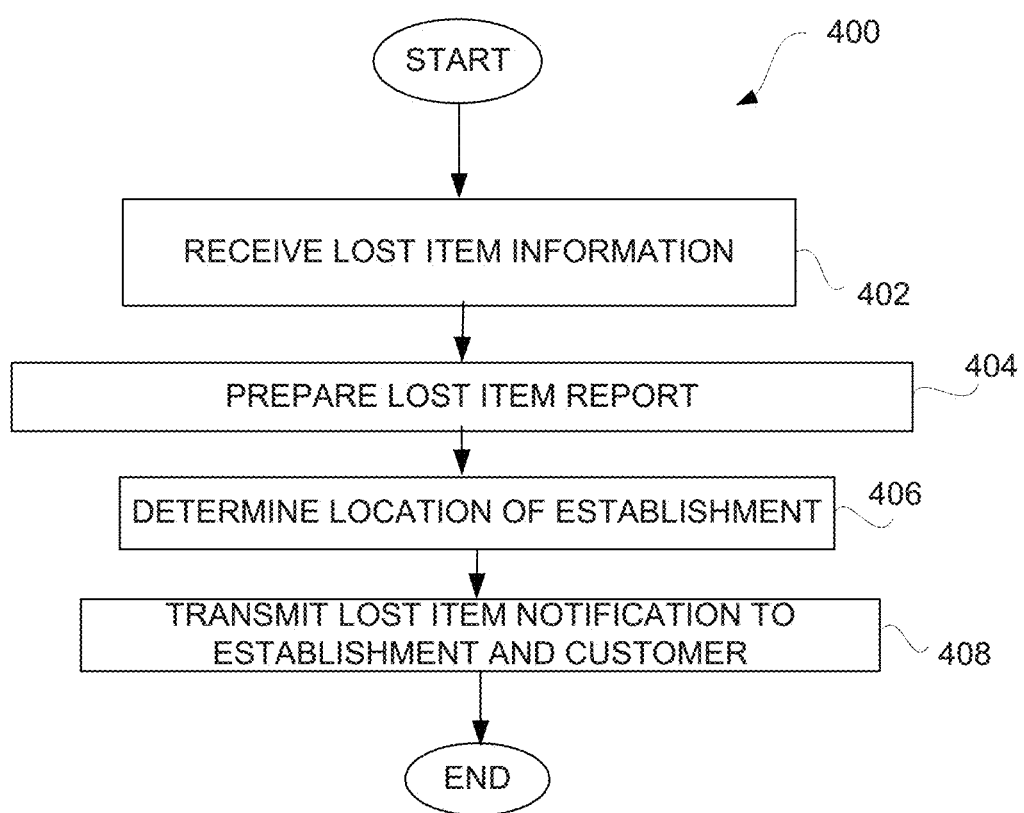
FIG. 4 illustrates an example method for reporting the lost item information to a centralized lost and found system.

FIG. 4 illustrates an example method for reporting the lost item information to a centralized lost and found system. The method 400 may begin by receiving lost item information at 402 by the centralized lost and found system. The lost item information may be information, such as contact information, customer name, product or service used (e.g., hotel stayed at, car rented, and the like). In one embodiment, at least part of the lost item information may include customer information.

The lost and found system may then prepare a lost item report at 404. The location of the establishment (e.g., location of a hotel, location of the rental car company, and the like) may be determined at 406. The determination of the location of the establishment may be based upon, in part, the received lost item information. Once location of the establishment is determined, notification of the lost item report may be transmitted to the establishment and the customer associated with the lost item at 408.

The lost item report or notification may inform the customer that the lost item information was received and that a notification was transmitted to the establishment (and/or broker). The lost item report or notification transmitted to the establishment (and/or broker) may inform them of a lost item and to contact the customer to if the lost item is/was found.

The lost item report or notification may be transmitted via any known transmission methods such as via electronic mail, facsimile, and the like. The electronic mail address, facsimile number, or any other contact information for the customer may be obtained from the broker (e.g., Broker 104 illustrated in FIG. 1) and/or large entity (e.g., large entity 110*a*, 110*b*). Additionally, the electronic mail address, facsimile number, or any other contact information for the broker (e.g., Broker 104 illustrated in FIG. 1) and/or large entity (e.g., large entity 110*a*, 110*b*) may be stored on the lost and found system. The lost item report or notification may also be the notification as discussed in U.S. patent application Ser. No. 13/22,244, filed Sep. 1, 2011, entitled "SYSTEM AND METHOD FOR INVENTORY AND RETURN OF LOST ITEMS", which is hereby incorporated herein by reference in its entirety for all purposes, or U.S. patent application Ser. No. 13/631,456, filed Sep. 28, 2012, entitled "LOST ITEM DATABASE TO FACILITATE RECOVERY OF LOST ITEMS", which is hereby incorporated herein by reference in its entirety for all purposes.

Using a centralized lost and found server to organize and coordinate lost and found items and information provides for a centralized lost and found system. The centralized system provides for a more efficient and organized reporting system of lost items. The centralized lost and found system may also be configured to maintain complete transaction logs that can serve as a chain of custody for can of the lost items, may automatically and electronically notify all parties to the transactions as to the current status of the lost report, collect payment for return shipping charges of a recovered lost item to the customer, and any other desired services for a lost and found item as described in U.S. patent application Ser. No. 13/22,244, filed Sep. 1, 2011, entitled "SYSTEM AND METHOD FOR INVENTORY AND RETURN OF LOST ITEMS" and U.S. patent application Ser. No. 13/631,456, filed Sep. 28, 2012, entitled "LOST ITEM DATABASE TO FACILITATE RECOVERY OF LOST ITEMS".

FIG. 5 illustrates an example graphical user interface to report lost item information. The GUI 500 may have indicia 502 associated with the large entity. The lost item report may emulate the large entity website so that reporting of the lost item information to the centralized lost and found system appears seamless to the customer.

The large entity may have a plurality of physical establishments or locations. Each establishment may be presented as a list 504. Although illustrated as a drop-down list (e.g., the user may select arrow 512 to select a list of establishments), each establishment of the large entity may be presented in any known manner.

Information associated with the lost item 506 may be inputted such as where the item was lost, when the item was lost, and a description of the lost item. Additionally, a customer contact information 508 and shipping information 510 may be inputted in the lost item report. When the lost item is found, the customer contact 508 and shipping information 510 may be used to contact the customer.

Figure 6:
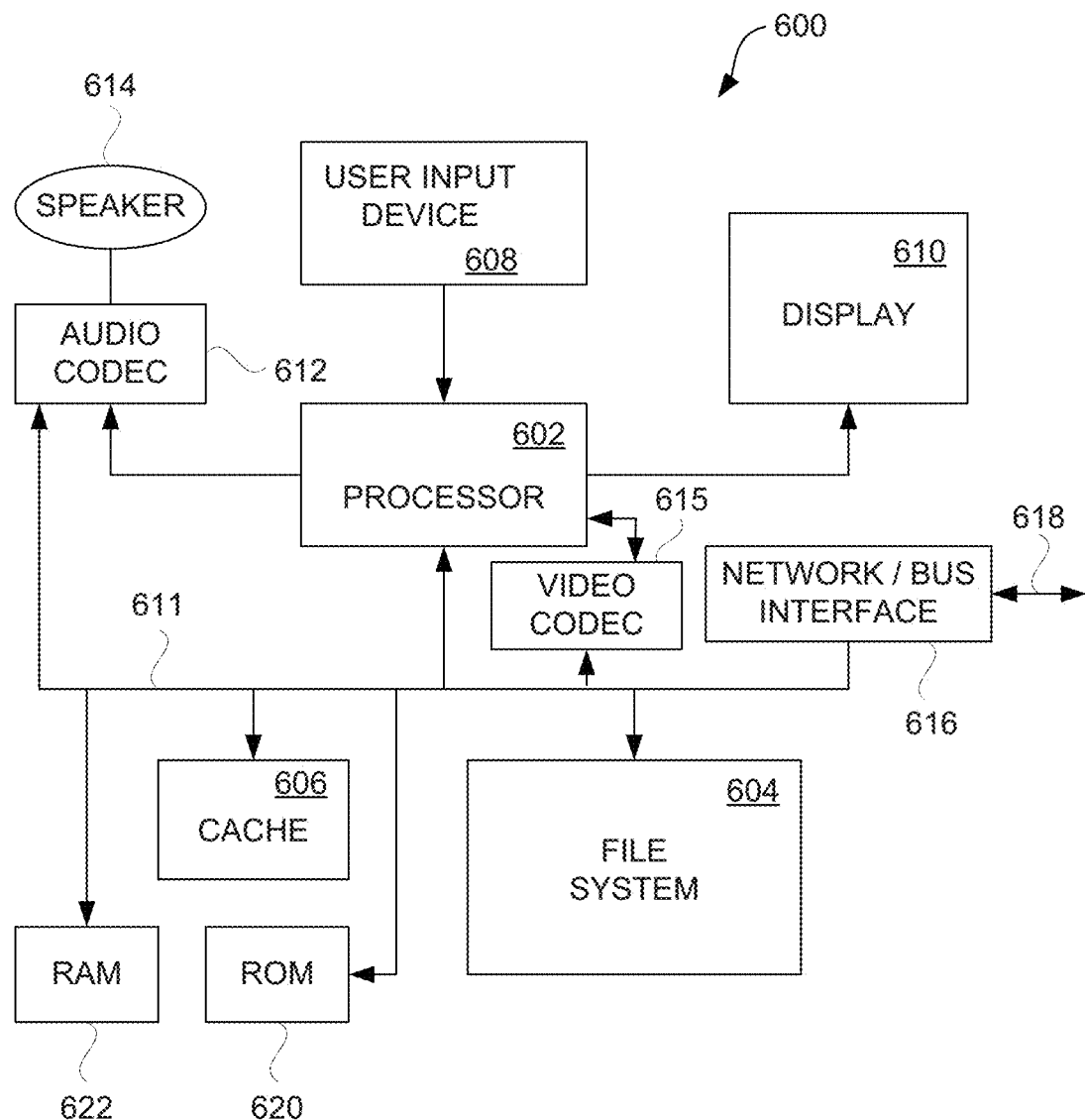
FIG. 6 illustrates a block diagram of a computing device according to one embodiment.

FIG. 6 illustrates a block diagram of a computing device according to one embodiment. The computing device 600 can represent circuitry of a representative computing device (e.g., Broker 104, lost and found server 108, large entity 110*a*,110*b*, customer device 102*a*-*n*) described and illustrated in FIG. 1. The computing device can be designed to be primarily stationary or can be portable.

The computing device 600 includes a processor 602 that pertains to a microprocessor or controller for controlling the overall operation of the computing device 600. The computing device 600 stores information pertaining to the customer or lost item information in a file system 604 and a cache 606. The file system 604 is, typically, semiconductor memory (e.g., Flash memory) and/or one or more storage disks. The file system 604 typically provides high capacity storage capability for the computing device 600. However, since the access time to the file system 604 can be relatively slow, the computing device 600 can also include the cache 606. The cache 606 is, for example, Random-Access Memory (RAM). The relative access time to the cache 606 is typically shorter than for the file system 604. However, the cache 606 does not have the large storage capacity of the file system 604. The computing device 600 also includes a RAM 620 and a Read-Only Memory (ROM) 622. The ROM 622 can store programs, utilities or processes to be executed in a non-volatile manner. The RAM 620 provides volatile data storage, such as for the cache 606.

The computing device 600 may also include a user input device 608 that allows a user of the computing device 600 to interact with the computing device 600. For example, the user input device 608 can take a variety of forms, such as a button, keypad, dial, touch-sensitive surface, etc. Still further, the computing device 600 includes a display 610 (screen display) that can be controlled by the processor 602 to display information to the user. A data bus 611 can facilitate data transfer between at least the file system 604, the cache 606, the processor 602, an audio coder/decoder (CODEC) 612 and/or a video CODEC 615.

In one embodiment, for example, if the computing device 600 (e.g., Broker 104, lost and found server 108, large entity 110*a*,110*b*, customer device 102*a*-*n* illustrated in FIG. 1) is a media player, the computing device 600 may store a plurality of customer information and/or lost item information in the file system 604. If the information is encrypted, the information may first be decrypted as noted above, which could involve one or more layers of encryption. As an example, for audio output, the processor 602 can supply the media data (e.g., audio file) for the particular media item to the audio CODEC 612. The audio CODEC 612 can then produce analog output signals for a speaker 614. The speaker 614 can be a speaker internal to the computing device 600 or external to the computing device 600. For example, headphones or earphones that connect to the computing device 600 would be considered an external speaker. As another example, for video output, the processor 602 can supply the media data (e.g., video file) for the particular media item to the video CODEC 615. The video CODEC 615 can then produce output signals for the display 610 and/or the speaker 614.

The computing device 600 also includes a network/bus interface 616 that couples to a data link 618. The data link 618 allows the computing device 600 to couple to another device (e.g., a host computer, a power source, or an accessory device). The data link 618 can be provided over a wired connection or a wireless connection. In the case of a wireless connection, the network/bus interface 616 can include a wireless transceiver.

The various aspects, features, embodiments or implementations of the invention described above can be used alone or in various combinations. Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment", "an embodiment", "one example" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

What is claimed is:

1. A computer-implemented method for reporting lost items, comprising:

receiving, via one or more computing devices, a user selection of a lost item reporting link presented on a webpage, the webpage with the lost item reporting link being presented on a display associated with another computing device and being associated with an entity;

initiating, via the one or more computing devices, presentment on the display, in response to the user selection of the lost item reporting link, a graphical user interface to solicit lost item recovery information;

determining whether a transaction identifier is received at the one or more computing devices;

receiving, via the one or more computing devices, the lost item recovery information via the graphical user interface, the lost item recovery information concerning a lost item;

preparing a lost and found report based on the lost item recovery information;

initiating electronic transmission of the lost and found report to the entity based on contact information for the entity; and initiating electronic transmission of a notification concerning the lost item to a customer based on customer contact information.

2. A computer-implemented method of claim 1, wherein the lost item recovery information being received includes a list of a plurality of different physical establishment locations associated with the entity.

3. A computer-implemented method of claim 1, wherein the receiving the lost item recovery information comprises retrieving the customer contact information based on the transaction identifier.

4. A computer-implemented method of claim 3, wherein the lost item recovery information being received includes a list of a plurality of different physical establishment locations associated with the entity.

5. A computer-implemented method of claim 1, wherein the computer-implemented method comprises:

facilitating return of the lost item to the customer based on the customer contact information if the notification is a found notification.

6. A computer-implemented method of claim 5, wherein the lost item recovery information being received includes a list of a plurality of different physical establishment locations associated with the entity.

7. A computer-implemented method of claim 1, wherein it is determined that the transaction identifier is received, and wherein the transaction identifier is associated with at least one customer reservation.

8. A computer-implemented method of claim 1, wherein the computer-implemented method comprises:

computer program code for generating a transaction log.

9. A computer-implemented method of claim 8, wherein the transaction log includes a chain of custody associated with the lost item.

10. A computer-implemented method of claim 1, wherein the notification concerning the lost item being transmitted to the customer comprises an electronic recovery notification that includes a plurality of return item options, the plurality of return item options include at least a hold item option, a return item to me option, and a do not return item option.

11. A computer-implemented method of claim 10, wherein the return item to me option includes at least one shipment option, the shipment options including links to initiate payment of shipment for return of the lost item to the current or prior patron.

12. A computer-implemented method of claim 1, wherein the lost item information includes at least a description of the given lost item, an image of the given lost item, and where and when the given lost item was found.

13. A computer-implemented method of claim 12, wherein the status of the given lost item is one of: recovered item shipped, current or prior patron notified, lost item disposed, lost item recovered, recovered item on hold.

14. A non-transitory computer readable medium including at least computer program code stored thereon for reporting lost items, comprising:
   computer program code for receiving a user selection of a lost item reporting link presented on a webpage, the webpage with the lost item reporting link being presented on a display associated with another computing device and being associated with an entity;
   computer program code for initiating presentment on the display, in response to the user selection of the lost item reporting link, a graphical user interface to solicit lost item recovery information;
   computer program code for determining whether a transaction identifier is received;
   computer program code for receiving the lost item recovery information, the lost item recovery information concerning a lost item;
   computer program code for preparing a lost and found report based on the lost item recovery information;
   computer program code for initiating electronic transmission of the lost and found report to the entity based on contact information for the entity; and
   computer program code for initiating electronic transmission of a notification concerning the lost item to a customer based on customer contact information.

15. A non-transitory computer readable medium of claim 14, wherein the lost item recovery information being received includes a list of a plurality of different physical establishment locations associated with the entity.

16. A non-transitory computer readable medium of claim 14, wherein the non-transitory computer readable medium comprises:
   computer program code for receiving the customer contact information based on the transaction identifier if it is determined that the transaction identifier is received.

17. A non-transitory computer readable medium of claim 14, wherein the non-transitory computer readable medium comprises:
   computer program code for facilitating return of the lost item to the customer based on the customer contact information if the notification is a found notification.

18. A non-transitory computer readable medium of claim 17, wherein the lost item recovery information being received includes a list of a plurality of different physical establishment locations associated with the entity.

19. A non-transitory computer readable medium of claim 18, wherein the non-transitory computer readable medium comprises:
   computer program code for receiving the customer contact information based on the transaction identifier if it is determined that the transaction identifier is received.

20. A non-transitory computer readable medium of claim 14, wherein it is determined that the transaction identifier is received, and wherein the transaction identifier is associated with at least one customer reservation.

21. A non-transitory computer readable medium of claim 14, wherein the non-transitory computer readable medium comprises:
   computer program code for generating a transaction log, the transaction log including at least a chain of custody associated with the lost item.

22. A computer-implemented method for reporting lost items, comprising:
   receiving, via one or more computing devices, a user selection of a lost item reporting link presented on a webpage, the webpage with the lost item reporting link being presented on a display associated with another computing device and being associated with an entity;
   initiating, via the one or more computing devices, presentment on the display, in response to the user selection of the lost item reporting link, a graphical user interface to solicit lost item recovery information;
   determining whether a transaction identifier is received at the one or more computing devices;
   receiving, via the one or more computing devices, a first part of the lost item recovery information via the graphical user interface, the lost item recovery information concerning a lost item;
   receiving, from a database, a second part of the lost item recovery information;
   preparing a lost and found report based on the lost item recovery information;
   initiating electronic transmission of the lost and found report to the entity based on contact information for the entity; and
   initiating electronic transmission of a notification concerning the lost item to a customer based on customer contact information.

* * * * *